United States Patent
Gerard et al.

[11] Patent Number: 5,127,315
[45] Date of Patent: Jul. 7, 1992

[54] BRAKE MOTOR SUBASSEMBLY AND PROCESS FOR ADJUSTING SUCH A SUBASSEMBLY

[75] Inventors: Jean-Louis Gerard, Paris; Gérard Le Deit, Courtry, both of France

[73] Assignee: Bendix Europe Services Techniques, Drancy, France

[21] Appl. No.: 652,951

[22] Filed: Feb. 11, 1991

[30] Foreign Application Priority Data

Feb. 21, 1990 [FR] France ............... 90 02105

[51] Int. Cl.$^5$ ............................................. F01B 9/02
[52] U.S. Cl. ................................... 92/13; 92/13.1; 92/13.7; 92/51; 92/53; 91/415; 188/71.9; 188/196 F
[58] Field of Search .............. 92/13, 13.1, 13.7, 51, 92/53; 91/415; 188/71.9, 196 F; 192/111 A

[56] References Cited

U.S. PATENT DOCUMENTS

| | | | |
|---|---|---|---|
| 3,638,763 | 1/1972 | Laverdant | 188/71.9 X |
| 3,768,602 | 10/1973 | Burnett | 188/71.9 |
| 3,848,705 | 11/1974 | Burnett | 188/71.9 |
| 4,167,989 | 9/1979 | Meyer | 188/71.9 |
| 4,246,985 | 1/1981 | Shimizu et al. | 188/71.9 |
| 4,691,809 | 9/1987 | Le Marchand et al. | 188/71.9 |
| 4,744,286 | 5/1988 | Gerard | 92/51 X |

FOREIGN PATENT DOCUMENTS

| | | | |
|---|---|---|---|
| 0242240 | 10/1987 | European Pat. Off. | |
| 0047027 | 4/1980 | Japan | 188/71.9 |
| 0047028 | 4/1980 | Japan | 188/196 F |
| 0163339 | 12/1980 | Japan | 188/71.9 |
| 0167544 | 10/1982 | Japan | 188/71.9 |
| 0021033 | 2/1983 | Japan | 188/71.9 |

Primary Examiner—Edward K. Look
Assistant Examiner—Todd Mattingly
Attorney, Agent, or Firm—Larry J. Palguta; Ken C. Decker

[57] ABSTRACT

A brake motor subassembly comprises a control piston (10) having an internal cavity delimited by a base wall (18) and, at the periphery, by a stepped bore (20, 22, 24) and having a mechanical actuating device acting on the control piston via an automatic compensation device formed by a screw-nut device (34) stressed towards the base wall, via a washer (26) and an axial thrust ball bearing (32), by a resilient member (28) supported on a ring (30) fixed at the end of the control piston axially opposite the base wall, and a pilot piston (44) having a first cylindrical peripheral surface of larger diameter (46) sealingly slideably cooperating with an end of reduced diameter (20) of the stepped bore and, in the vicinity of its end (50) axially opposite to the first peripheral surface (46) and cooperating with the washer (26), a second peripheral surface of reduced diameter (54) sealingly slideably cooperating with an annular seal (38) associated with a retaining washer (40) resting axially against a shoulder (42) extending radially towards the interior between the end portion of smaller diameter (20) and the intermediate portion (22) of the stepped bore in which the annular seal (38) is mounted, the pilot piston (44) being stressed towards the base wall (18) by the resilient member (28) via the washer (26). A mechanism is provided for adjusting the stress exerted by the resilient member (28) on the pilot piston (44) to a predetermined value.

17 Claims, 2 Drawing Sheets

BRAKE MOTOR SUBASSEMBLY AND PROCESS FOR ADJUSTING SUCH A SUBASSEMBLY

BACKGROUND OF THE INVENTION

The present invention relates to a brake motor subassembly, more particulary for a disc-brake, of the type comprising a control piston, typically intended to be sealingly slideably mounted in a bore of a brake body having an internal cavity delimited by a base wall and, at the periphery, by a stepped bore and having a mechanical actuating device acting on the control piston via an automatic compensation device formed by a screw-nut device typically intended to be placed in engagement on a threaded spindle mounted in the brake body, and stressed towards the base wall, via a washer and an axial thrust ball bearing, by a resilient member resting on the control piston at the opposite end, axially, to the base wall, and a stepped pilot piston intended to permit an inhibition of the automatic compensation in the case of excessive actuating pressure on the control piston in order to avoid an overadjustment of the brake motor, the stepped pilot piston having a first outer cylindrical peripheral surface of larger diameter sealingly slideably cooperating with an end of reduced diameter of the stepped bore and, in the vicinity of its end axially opposite to the first peripheral surface and cooperating, in contact, with the washer, a second cylindrical peripheral surface of reduced diameter cooperating sealingly slideably with an annular seal associated with a retaining washer placed resting axially against a shoulder extending radially towards the interior between the end portion of smaller diameter and the intermediate portion of the stepped bore in which the annular seal is mounted.

A brake motor subassembly of this type is described in U.S. Pat. No. 4,744,286. In the subassembly described in this document, when the stepped pilot piston is used to push back the washer counter to the resilient member and in this way interrupt the driving link between the control piston and the automatic compensation nut in the case of excessive braking pressure, the pilot piston is displaced under the effect of this braking pressure in the opposite direction to the base wall of the internal cavity of the control piston as far as a position in which a radial shoulder of the pilot piston comes to bear on a ring cooperating with an annular seal, this interrupting the displacement of the pilot piston and avoiding the crushing of the resilient member normally stressing the automatic compensation nut.

Although such a subassembly functions in an entirely satisfactory manner, its functioning characteristics nevertheless exhibit spread in series production. This spread is caused by the tolerances permitted for the manufacture of the different mechanical components and of the annular seals, this resulting in different frictions at the seals when the subassembly is subjected to the pressure of a hydraulic fluid, from which it follows finally that the neutralization of the automatic compensation occurs in a very wide range of values of the pressure of the hydraulic fluid.

SUMMARY OF THE INVENTION

It is therefore an object of the present invention to obviate these disadvantages by proposing a simple and effective arrangement which is totally integrated, does not entail any additional manufacturing costs and allows the adjustment of the point of intervention of a brake motor subassembly, i.e. the adjustment of this subassembly so that the neutralization of the automatic compensation occurs at a predetermined pressure of the hydraulic fluid.

To do this, the invention provides means for adjusting the stress exerted by the resilient member on the pilot piston to a predetermined value.

According to one feature of the invention, the control piston is formed by a part forming the base wall of the internal cavity and by a part forming the stepped bore peripherally delimiting the internal cavity.

According to an advantageous feature of the invention, the part forming the base wall is externally threaded and the part forming the stepped bore is internally threaded, and the adjustment of the stress exerted by the resilient member on the pilot piston is obtained by screwing or unscrewing the two parts one on the other.

It is likewise an object of the present invention to provide a process for adjusting a brake motor subassembly which is simple, rapid and reliable to put into use.

To do this, the invention provides a process for adjusting such a subassembly which comprises the following steps:

the brake motor subassembly is subjected to the action of a hydraulic fluid under an increasing pressure, the pressure $P_i$ of the hydraulic fluid at which the subassembly begins to absorb hydraulic pressure and the pilot piston begins to move back counter to the stressing of the resilient member is detected, the stressing of the resilient member is adjusted so that the pressure $P_i$ of the hydraulic fluid is equal to a predetermined pressure.

BRIEF DESCRIPTION OF THE DRAWINGS

Other features and advantages of the present invention will emerge from the following description of one embodiment, given by way of example and with reference to the attached drawings, in which:

the FIG. 1 is a schematic view in half section of an embodiment of a brake motor subassembly according to the invention, and the FIG. 2 is a schematic view in half section of a variant of the embodiment of the brake motor subassembly shown in the FIG. 1.

DETAILED DESCRIPTION OF THE INVENTION

Figure 1:
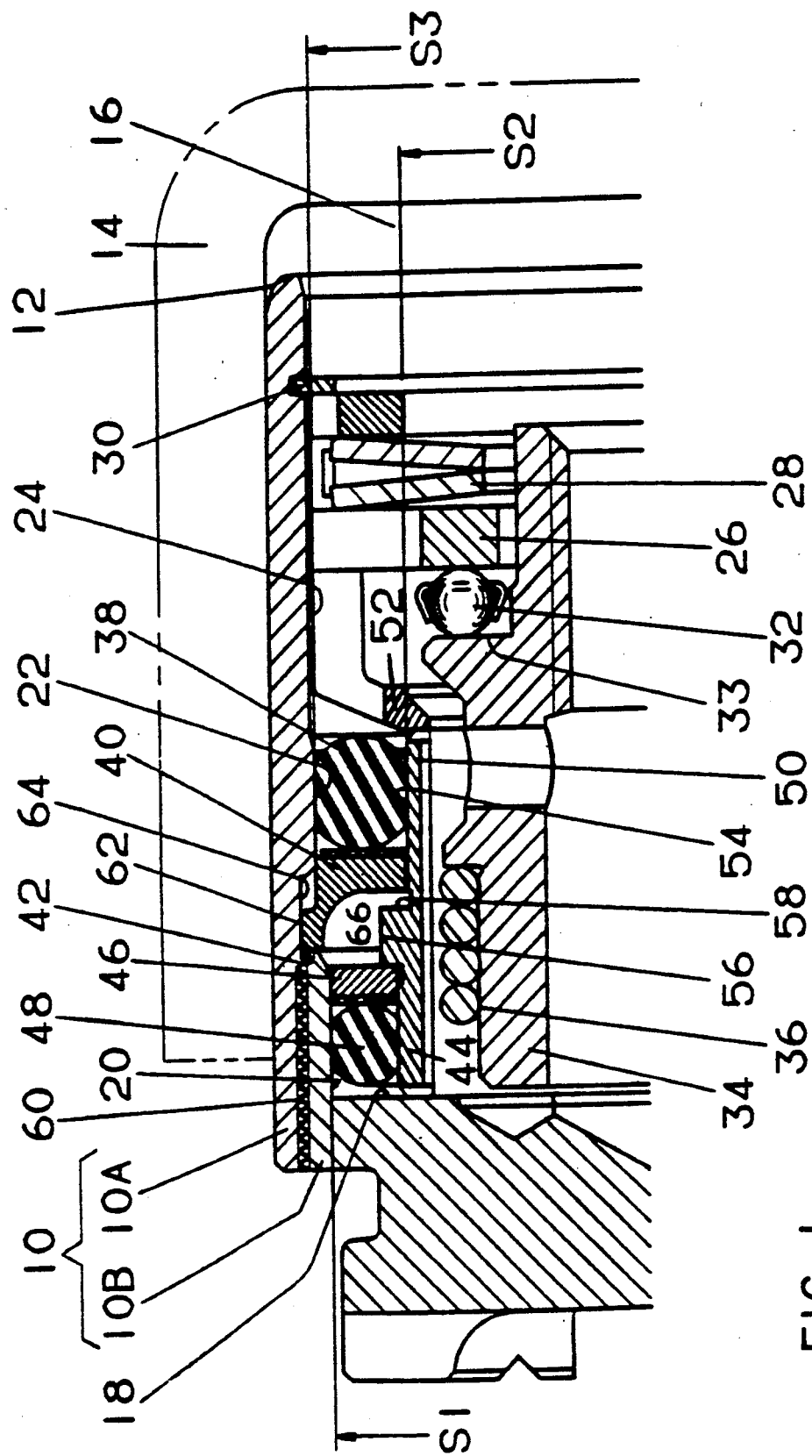

Discernable in the FIG. 1 is a brake motor subassembly of a type such as that described in the abovementioned document and comprising a control piston 10 intended to be sealingly slideably mounted in a bore 12 of a brake body 14 defining a pressure chamber 16 receiving a hydraulic fluid under pressure permitting the displacement in the bore 12 of the control piston 10 for the purpose of actuating at least one friction element (not shown) in order to bring the latter into frictional contact with a rotary member to be braked (not shown). In the description which follows, "rear" is by convention used to refer to the part of the subassembly which is furthest away from the friction element and "front" to the part in contact with the friction element. In the figure, the rear is thus on the right and the front on the left.

On the inside, the control piston 10 is formed with an internal cavity delimited by a base wall 18 and, at the periphery, by a stepped bore comprising, in the vicinity of the base wall 18, an inner end portion of reduced diameter 20 prolonged by an intermediate portion of greater diameter 22, itself connected to another end portion of larger diameter 24. Slideably mounted in this end portion of larger diameter 24 is a rear washer 26 stressed towards the front in the direction of the base wall 18 by a resilient member 28 made up, for example, by Belleville washers supported at the rear on a retaining ring 30 mounted in the opening end of the bore portion of larger diameter 24. Via an axial thrust ball bearing 32, the washer 26 cooperates with a rear shoulder 33 of an automatic compensation nut 34 associated with a unidirectional engagement spring 36 in accordance with a conventional arrangement, the nut 34 being intended, when the equipped control piston 10 is placed in the bore 12 of the brake body, to cooperate in engagement with a threaded spindle (not shown) mounted in the brake body 14 and typically coupled to a mechanical actuating device of the control piston 10. Arranged in the intermediate bore portion 22 is an annular seal 38 associated with a retaining washer 40 placed resting axially against a shoulder extending radially towards the interior 42 between the end portion of smaller diameter 20 and the intermediate portion 22 of the stepped bore.

Arranged coaxially around the nut 34 in the cavity of the control piston 10 is a pilot piston 44 integral on the side of the base wall 18 with a piece having a first outer cylindrical peripheral surface 46 of larger diameter sealingly slideably cooperating, via an annular seal 48, with the end portion of small diameter 20 of the stepped bore, and an opposite end part of reduced thickness 50 cooperating in engaging contact by means of an annular intermediate piece 52 with the washer 26 and having a cylindrical peripheral surface of reduced diameter 54 sealingly slideably cooperating with the annular seal 38. In the rest position represented in FIG. 1, the pilot piston 44 is pressed against the base wall 18 by the washer 26 under the effect of the resilient member 28. The pilot piston 44 having axially, on each side, differential annular surfaces $S_1$ and $S_2$ exposed to the fluid pressure in the pressure chamber 16, with $S_1$ greater than $S_2$, when this fluid pressure exceeds a value determined by the ratio of these surfaces and by the force of the resilient member 28, the pilot piston 44 is displaced towards the rear counter to the force of the resilient member 28 in order to move the washer 26 away from the rear shoulder 33 of the nut 34 and in this way prevent the latter being subjected by the washer 26 accompanying—via the resilient member 28—the displacement of the control piston 10, to an axial thrust resulting in a play-compensating rotation of the nut 34 on the threaded spindle coupled to the mechanical actuating device of the brake motor.

The pilot piston 44 has an intermediate portion having a cylindrical peripheral surface 56 of a diameter intermediate between that of the peripheral surfaces 46 and 54 and connected to the latter surface by a radial shoulder 58 capable of coming to bear against the ring 40 on displacement of the pilot piston 44 towards the rear. In this condition, corresponding to a limited compression of the resilient member 28, although the effective surface to the left of the pilot piston 44 remains the surface $S_1$, the effective surface presented to the fluid pressure to the right of the pilot piston 44 is no longer the surface $S_2$ but, due to the annular seal 38, the surface $S_3$ greater than $S_1$, as defined by the diameter of the intermediate part 22 of the stepped bore. Due to this inversion of the ratio of the effective surfaces, subjected to the fluid pressure, of the pilot piston 44, the displacement towards the right of the latter is interrupted, the pilot piston 44 maintaining this position due to the fact that the assembly of the annular seal 38 and the retaining ring 40 cannot be displaced towards the left due to the shoulder 42. As soon as the actuating pressure in the chamber 16 diminishes, the differential pressure effect on the pilot piston 44 fades and the resilient member 28 brings the washer 26 and the pilot piston 44 back towards the rest position represented in the figure.

As indicated above, the result of the tolerances permitted in the manufacture of the different elements composing the subassembly, both in the dimensions of the mechanical components and in the composition of the seals, is that the function of such a subassembly may occur in a large range of hydraulic pressures from one subassembly to the other in series production.

According to the invention, this range of pressures in which the inhibition of the automatic adjustment occurs is reduced to a minimum by providing an adjustment of this point of intervention. This adjustment is obtained by varying the stress exerted by the resilient member 28 on the pilot piston 44. To do this, the control piston 10 is made in two parts 10A and 10B. The first part 10A is tubular and forms portions 22 and 24 of the stepped bore peripherally delimiting the internal cavity of the control piston. Its front end, which is turned towards the friction element (not shown) is formed with an internal thread 60 and by screwing receives the second part 10B, threaded on the outside and forming the base wall 18 of the internal cavity of the control piston. This second part 10B is formed with a blind bore constituting the end portion of reduced diameter 20 of the stepped bore of the control piston, and its rear part, penetrating into the first part 10A, forms the shoulder 42 between the portion of smaller diameter 20 and the intermediate portion 22 of the stepped bore. The retaining washer 40 is formed with a cylindrical extension 62 extending axially towards the front and situated in a portion of larger diameter 64 of the stepped bore, such that this extension 62 bears on the shoulder 42. In an advantageous manner by virtue of this embodiment of the invention, the space 66 situated between the piston 44–46, the bore 22–64 and the seal 38 is connected to the atmosphere simply between the two parts 10A and 10B through the interstices between the internal thread 60 of part 10A and the thread of part 10B.

It can thus be understood that, by virtue of the invention, the position of the shoulder 42 separating the portions 20 and 64 of the stepped bore, and consequently the position of the retaining washer 40, is varied by screwing part 10B into part 10A to a greater or lesser extent. The pilot piston 44 bearing on the base wall 18 will then compress the resilient member 28 to a greater or lesser extent via the intermediate piece 52 and the washer 26. It follows that the movement of the pilot piston 44 towards the rear, taking place counter to the force exerted by the resilient member 28, which force is a function of the compression of this resilient member, will begin at a value of the pressure of the fluid in the pressure chamber 16 which it will thus be possible to adjust in a precise manner to take account of the manufacturing tolerances and of the frictions of the seals under pressure.

By virtue of the invention, a brake motor subassembly has thus been achieved in which the neutralization of the automatic compensation can be adjusted to the desired pressure of the hydraulic fluid by simple and reliable means and without any additional manufacturing cost. Once this point of intervention has been adjusted to the desired value, it suffices to fix the pieces 10A and 10B firmly together, for example by crimping, for the subassembly to preserve its functioning characteristics.

The adjustment of such a subassembly is likewise effected in a very simple manner. Once the subassembly has been assembled, it is subjected to the action of a hydraulic fluid under pressure. The absorption of the subassembly is measured by a conventional method, i.e. the volume of hydraulic fluid which it is necessary to supply to the subassembly as a function of the pressure of this hydraulic fluid. When the pressure $P_i$ of the hydraulic fluid reaches a value determined by the ratio of the surfaces $S_1$ and $S_2$ and by the force of the resilient member 28, the pilot piston 44 begins to be displaced towards the rear and the subassembly thus begins to absorb a certain quantity of hydraulic fluid.

It can be understood therefore that, by virtue of the invention, by screwing or unscrewing part 10B in part 10A and thus, as explained above, by compressing the resilient member 28 to a greater or lesser extent, it is possible to bring about the displacement towards the rear of the pilot piston 44 at a predetermined value of the pressure of the hydraulic fluid, which displacement can be detected by measuring the absorption of the subassembly, and, the point of intervention of the brake motor subassembly is then adjusted at the predetermined value of the pressure of the hydraulic fluid at which it is desired that the automatic compensation be neutralized. Once the brake motor subassembly has been adjusted in this way, all that remains is to fix the pieces 10A and 10B firmly one on the other for the subassembly to maintain the point of intervention thus set.

Figure 2:
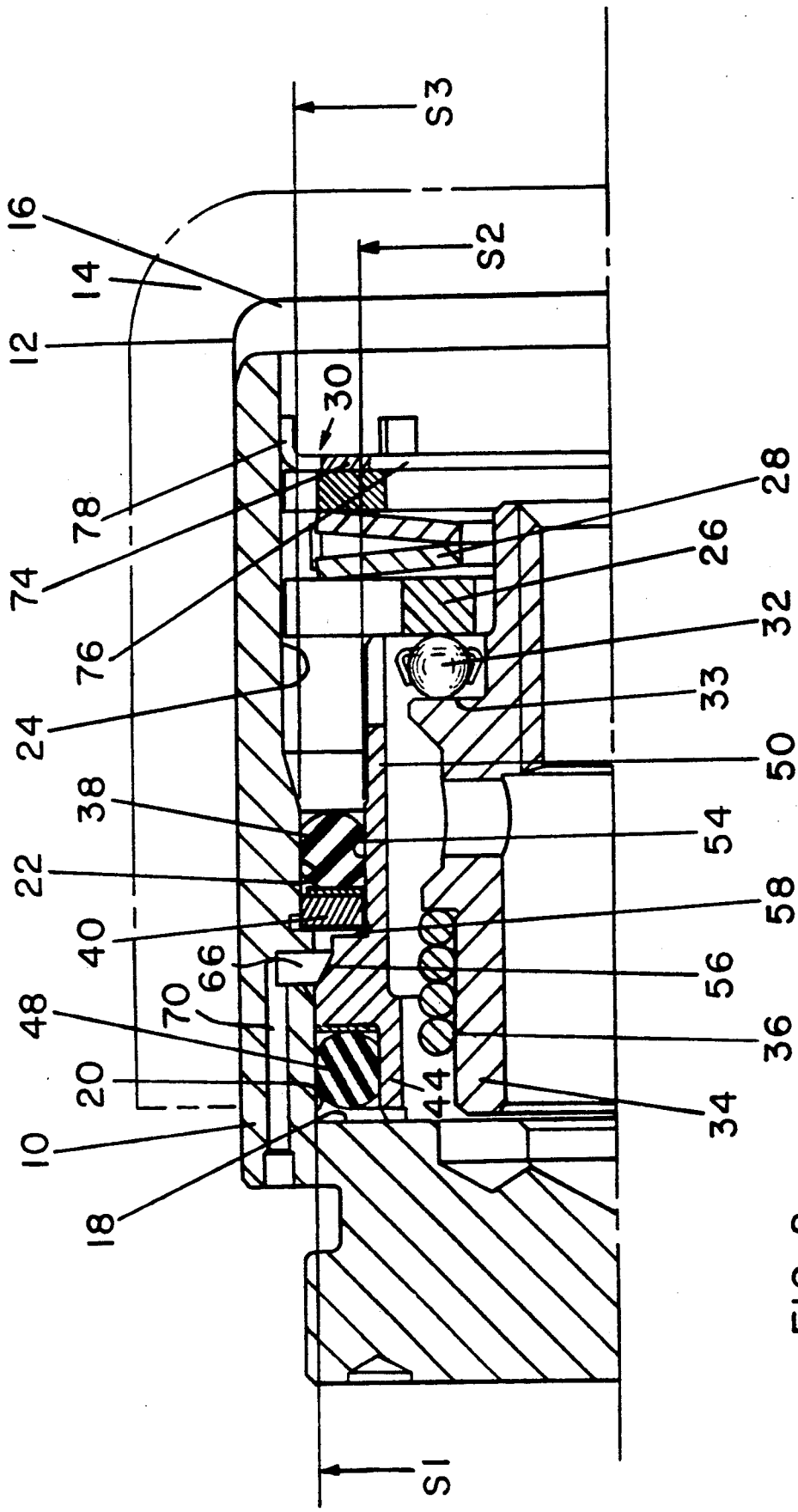

Shown in the FIG. 2 is a variant of the embodiment of the FIG. 1, where the same elements have been given the same numeric references. It can be seen in the FIG. 2 that the control piston 10 is made of only one part. A drilled hole 70 made in the body of the control piston 10 connects the space 66 to the atmosphere, and the retaining ring 30 comprises a plane part having the form of a disc 74 having a central opening 76 which disc being connected by its external peripheral edge to a cylindrical part 78 extending axially rearwardly.

According to this variant of embodiment, the force exerted by the resilient member 28 determining, as explained before, the beginning of the stroke of the pilot piston 44 rearwardly, i.e. the value of the fluid pressure in the pressure chamber 16 for which the neutralization of the automatic compensation occurs, is easily adjusted by setting the position of the ring 30 in the bore 24, for example by applying on the rear side of the ring 30 a predetermined force with an appropriate tool. It can then be provided that the ring 30 be forced by its cylindrical part 78 into the bore 24 and remain at the location thus determined. Preferably, welding of the ring 30 in the bore 24 can be effected, for example by means of a laser, to stop it in that position.

It can be also provided that the cylindrical part 78 be realised with an external thread cooperating with an internal thread formed at the rear end of the bore 24. As in the previous embodiment, by screwing or unscrewing the ring 30 in the bore 24, the resilient member 28 is then compressed to a greater or lesser extent, and then, as explained before, the point of intervention of the subassembly is then adjusted to the desired value by means of the same adjusting process as previously described. The ring 30 can then be firmly fixed to the control piston 10, for example by stamping or by welding, and particularly by laser welding.

Although the present invention has been described in relation to a particular embodiment, it is not limited by that but, on the contrary, is capable of modifications and of variants which will be apparent to the person skilled in the art. For example, provision could be made to adjust the point of intervention or the prestress of the resilient member 28 by adjusting the position of the retaining ring 30 in the bore 24 by making the rear part of the subassembly defining the bore 24 in two parts screwed one onto the other. Provision could likewise be made to make the pilot piston 44 or the annular intermediate piece 52 of adjustable length. Likewise, provision could be made to use a pneumatic fluid instead of a hydraulic fluid to set the adjusting.

What we claim is:

1. A brake motor subassembly comprising a control piston having an internal cavity delimited by a base wall and, at a periphery, by a stepped bore and having a mechanical actuating device acting on the control piston via an automatic compensation device formed by a screw-nut device stressed toward the base wall, via a rear washer and an axial thrust ball bearing, by a resilient member supported by a ring located at one end of the control piston and axially opposite the base wall, and a pilot piston having a first cylindrical peripheral surface of larger diameter sealingly and slideably cooperating with an end portion of reduced diameter of the stepped bore and, adjacent to an end of said pilot piston and axially opposite to the first cylindrical peripheral surface, a second peripheral surface of reduced diameter sealingly and slideably cooperating with an annular seal adjacent a retaining washer resting axially against a shoulder extending radially toward the interior between the end portion of reduced diameter and an intermediate portion of the stepped bore in which the annular seal is mounted, the pilot piston being stressed toward the base wall by the resilient member via the rear washer, and means being provided for adjusting to a predetermined value the stress exerted by the resilient member on the pilot piston.

2. The subassembly according to claim 1, wherein the control piston is made up of a part forming the base wall of the internal cavity and of a part forming the stepped bore peripherally delimiting the internal cavity.

3. The subassembly according to claim 2, wherein the part forming the base wall of the internal cavity is externally threaded and the part forming the stepped bore is internally threaded.

4. The subassembly according to claim 3, wherein the stress exerted by the resilient member on the pilot piston is adjusted by one of screwing and unscrewing, one on the other, of the parts forming the base wall and forming the stepped bore.

5. The subassembly according to claim 2, wherein the part forming the base wall of the internal cavity is formed by a blind bore forming the end portion of reduced diameter of the stepped bore of the control piston.

6. The subassembly according to claim 5, wherein a rear part of the part forming the base wall of the internal cavity forms a shoulder between the end portion of reduced diameter and the intermediate portion of the stepped bore.

7. The subassembly according to claim 6, wherein a space situated between the pilot piston, the intermediate portion of the stepped bore and the annular seal is connected to the atmosphere via an internal thread of the part forming the stepped bore.

8. The subassembly according to claim 1, wherein the stress exerted by the resilient member on the pilot piston is adjusted by setting the position of the ring in the bore of the control piston.

9. The subassembly according to claim 8, wherein the position of the ring in the bore of the control piston is set by applying a predetermined force on a rear side of the ring.

10. The subassembly according to claim 8, wherein the position of the ring in the bore of the control piston is set by one of screwing and unscrewing of the ring in the bore.

11. A process for adjusting a brake motor subassembly comprising a control piston having an internal cavity delimited by a base wall and, at a periphery, by a stepped bore and having a mechanical actuating device acting on the control piston via an automatic compensation device formed by a screw-nut device stressed toward the base wall, via a rear washer and an axial thrust ball bearing, by a resilient member supported by a ring located at one end of the control piston and axially opposite the base wall, and a pilot piston having a first cylindrical peripheral surface of larger diameter sealingly and slideably cooperating with an end portion of reduced diameter of the stepped bore and, adjacent to an end of said pilot piston and axially opposite to the first cylindrical peripheral surface, a second peripheral surface of reduced diameter sealingly and slideably cooperating with an annular seal associated with a retaining washer resting axially against a shoulder extending radially toward the interior between the end portion of reduced diameter and an intermediate portion of the stepped bore in which the annular seal is mounted, the pilot piston being stressed toward the base wall by the resilient member via the rear washer, and means being provided for adjusting to a predetermined value the stress exerted by the resilient member on the pilot piston, said process comprising the following steps:

subjecting the brake motor subassembly to a fluid under an increasing pressure, detecting a pressure $P_i$ of the fluid at which the subassembly begins to absorb fluid and at which the pilot piston begins to move back counter to the stressing of the resilient member, and adjusting the stressing of the resilient member so that the pressure $P_i$ of the fluid is equal to a predetermined pressure.

12. The adjustment process according to claim 11, further comprising the step of adjusting the stressing of the resilient member by one of screwing and unscrewing, one on the other, of parts forming the base wall and forming the stepped bore.

13. The adjustment process according to claim 11, further comprising the step of adjusting the stressing of the resilient member by setting the position of the ring in the bore of the control piston.

14. The adjustment process according to claim 13, further comprising the step of setting the position of the ring in the bore of the control piston by applying a predetermined force on a rear side of the ring.

15. The adjustment processing according to claim 13, further comprising the step of setting the position of the ring in the bore of the control piston by one of screwing and unscrewing of the ring in the bore.

16. The adjustment process according to claim 11, wherein the process further comprises the step of fixing firmly together a part forming the base wall and a part forming the stepped bore.

17. The adjustment process according to claim 11, wherein the process further comprises the step of fixing firmly together the ring and the control piston.

* * * * *